United States Patent

Yoo

[11] Patent Number: 5,812,504
[45] Date of Patent: Sep. 22, 1998

[54] LIFT CONTROL DEVICE AND METHOD FOR CONTROLLING A LIFTER IN OPTICAL DISK PLAYER

[75] Inventor: Hyung Jun Yoo, Seoul, Rep. of Korea

[73] Assignee: Goldstar Co., Ltd., Seoul, Rep. of Korea

[21] Appl. No.: 747,570

[22] Filed: Nov. 12, 1996

Related U.S. Application Data

[63] Continuation of Ser. No. 291,478, Aug. 17, 1994, abandoned.

[30] Foreign Application Priority Data

Aug. 17, 1993 [KR] Rep. of Korea .................. 1993-15831

[51] Int. Cl.$^6$ .................................................. G11B 7/095
[52] U.S. Cl. ........................................... 369/44.32; 369/54
[58] Field of Search ............... 369/44.29, 44.32, 369/44.35–44.36, 54, 58

[56] References Cited

U.S. PATENT DOCUMENTS

| | | | |
|---|---|---|---|
| 5,027,336 | 6/1991 | Sugiura | 369/44.13 |
| 5,182,739 | 1/1993 | Kime et al. | 369/44.32 X |
| 5,206,848 | 4/1993 | Kusano et al. | 369/44.41 |
| 5,216,649 | 6/1993 | Koike et al. | 369/44.23 |
| 5,345,432 | 9/1994 | Kasahara et al. | 369/44.14 X |
| 5,347,503 | 9/1994 | Koyama et al. | 369/44.32 |

*Primary Examiner*—W. R. Young

[57] ABSTRACT

A lift control device with a tilt sensor for controlling a lifter which moves a pickup assembly vertically, includes a light mechanism for emitting a light beam to the surface of a disk, a converting unit for converting a light beam reflected from the surface of the disk into voltage signals, a tilt detecting unit for detecting a tilt between an axis of the light beam and an axis perpendicular to the surface of the disk according to the voltage signals from the converting unit and generating a tilt monitor signal based on the detection, and a driving unit for controlling the lifter and thereby vertically moving the pickup assembly according to the tilt monitor signal.

14 Claims, 7 Drawing Sheets

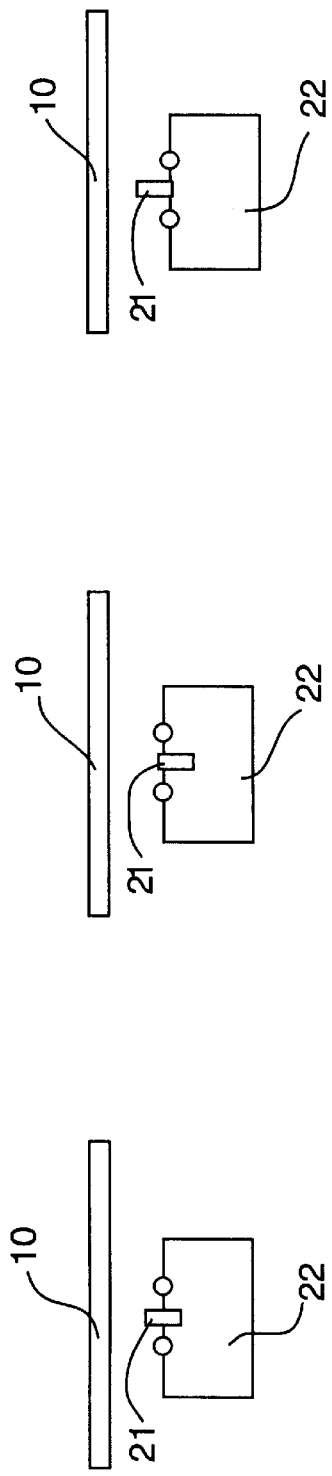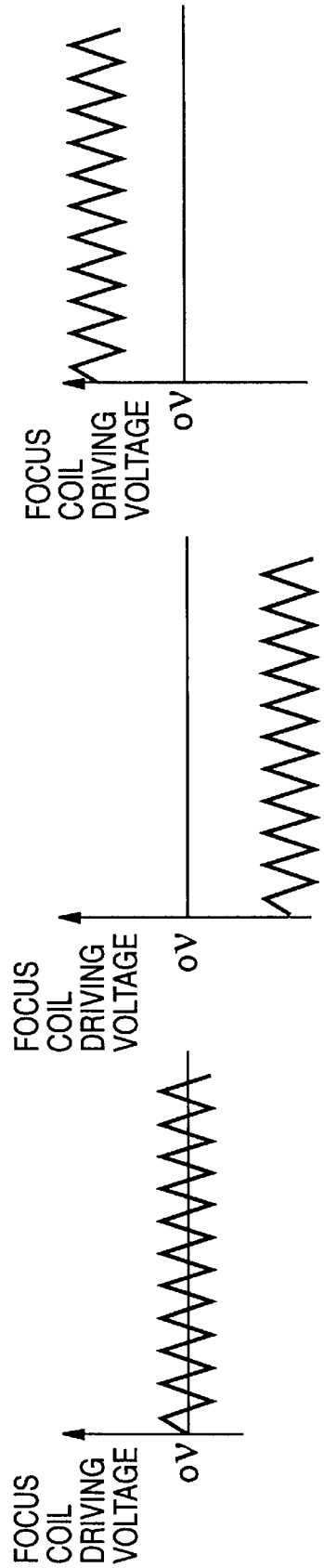

LIFT CONTROL DEVICE AND METHOD FOR CONTROLLING A LIFTER IN OPTICAL DISK PLAYER

This application is a continuation of application Ser. No. 08/291,478 filed on Aug. 17, 1994, now abandoned.

BACKGROUND OF THE INVENTION

The present invention relates to a tilt servo and a lift servo of a laser disk player, and more particularly to a lift control device controlled by an output of a tilt sensor.

Generally as shown in FIG. 1(a), a conventional lift control device comprises a pickup unit including a pickup lens 21 and a pickup carriage 22 for emitting a laser beam through the pickup lens 21 to a disk 10 and reading disk information from the reflected light beam, a pickup rail 30 for moving the pickup unit horizontally, and a lifter (not shown) for keeping the distance between the pickup lens 21 and the disk 10 at a prescribed value. Conventionally, it is known that the lifter moves the pickup unit to one fixed position only once before the reading of the disk. Then a focusing servo mechanism moves the pickup lens 21 by moving the focus coil.

The laser disk 10 is different from a compact disk in that its size diameter is bigger and its weight is heavier than the compact disk, and its materials are different from those of the compact disk. Therefore the disk 10 warps due to gravity and heat.

As shown in FIG. 1(b), since the disk 10 warpe more and more at the outer circumference, the distances between the disk 10 and the pickup lens 21 at inner and outer circumferences are different.

The pickup lens 21 is moved within its movable distance set by the focus coil and focusing servo mechanism.

Although the movable distance of the pickup lens 21 is different according to a pickup specification, it is usually about 3.4 mm. A usual focusing servo mechanism is designed to operate the pickup lens 21 at the center of the movable range, so that the pickup lens 21 is movable up and down. A focus distance is set to read information from the disk 10 through the pickup lens 21, and the focal distance is usually 1.9 mm in a laser disk.

As shown in FIG. 1(b), the pickup rail 30 controls the pickup lens 21. The pickup lens 21 is moved to operate in the lower portion of the movable range. Accordingly, when the pickup lens 21 is moved further downwardly according to focusing error, focusing of the pickup lens 21 cannot be accomplished.

To focus the pickup lens, a conventional lift servo of FIG. 2 for positioning the pickup lens 21 at the center of its movable range is by driving the focus coil provided. In the operation of the conventional lift servo, a direct current component is extracted from a focus coil driving voltage for driving the focus coil, by an LPF (low pass filter). As shown in FIGS. 3(a)–3(f), because the outputs of the focus coil driving voltage are different according to the position of the pickup lens 21, information about the position of the pickup lens 21 is obtained through the direct current component of the focus coil driving voltage. The direct current component is converted into a digital signal by an analog-to-digital converter 32, and the converted digital signal is supplied to a microcomputer 33 which determines a limit value of the direct-current voltage. When the direct-current voltage exceeds the limit value, a lift motor 35 is driven by a lift motor driving unit 34 and the direct-current voltage is controlled to be within the limit value. Consequently, the pickup lens 21 is located at the center of the movable range at all times.

However, since the lift motor is driven according to the focus coil driving voltage in the conventional lift control apparatus, accurate correction for the position of the pickup lens in the middle of its movable range by moving the conventional lifter may be possible in a normal case, but accurate conventional position of the pickup lens by moving the which drives the focus coil lifter which drives the focus coil is not possible when the disk is warped and drooped.

On the other hand, a conventional tilt servo prevents crosstalks which results from coma aberration by setting the angle between the surface of the disk 10 and the pickup lens 21 accurately. As shown in FIG. 4a, luminous infrared LED emits a light beam which is reflected from the surface of the disk, the reflected light beam is converted into an electrical signal through two photodiodes, and the tilt servo is controlled by a difference between respective intensities of light received by the photodiodes. The outputs of the photodiodes of FIG. 4 are proportional to the light reflected which varies according to the distance between the surface of the disk and the LED and reflection factor of the disk. Conventionally, the output of the amplifier OP3 is used to tilt the pickup lens so as to be perpendicular to a given portion of the disk. However, when the disk is so warped and drooped, neither the conventional tilt servo nor the conventional lift servo can compensate for the warping effect of the disk, and therefore the pickup lens remains out of focus and failure of reading data occurs.

SUMMARY OF THE INVENTION

Accordingly, it is an object of the present invention to provide a lift control device controlled by an output of a tilt sensor.

It is another object of the present invention to selectively move a lifter for vertically moving a pickup assembly according to a tilt of a disk detected by a tilt sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the invention is directed to a lift control device with a tilt sensor for controlling a lifter which moves a pickup assembly vertically, the device including light means for emitting a light beam to the surface of a disk; converting means for converting a light beam reflected from the surface of the disk into voltage signals; tilt detecting means for detecting a tilt between an axis of the light beam and an axis perpendicular to the surface of the disk according to the voltage signals from said converting means and generating a tilt monitor signal based on the detection; and driving means for controlling the lifter and thereby vertically moving the pickup assembly according to the tilt monitor signal.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIG. 3(a) shows the pickup lens at a normal position, FIG. 3(b) shows the pickup lens at a downside position, and FIG. 3(c) shows the pickup lens at an downside position;

FIG. 3(d) shows a focus coil driving voltage signal when the pickup lens is at a normal position as shown in FIG. 3(a), FIG. 3(e) shows a focus coil driving voltage signal when the pickup lens is at a downside position as shown in FIG. 3(b), and FIG. 3(f) shows a focus coil driving voltage signal when the pickup lens is at an upside position as shown in FIG. 3(c);

DETAILED DESCRIPTION OF THE PREFERRED EMBODIMENTS

A preferred embodiment of the present invention is described in detail hereinafter by accompanying drawings.

Figure 1A:
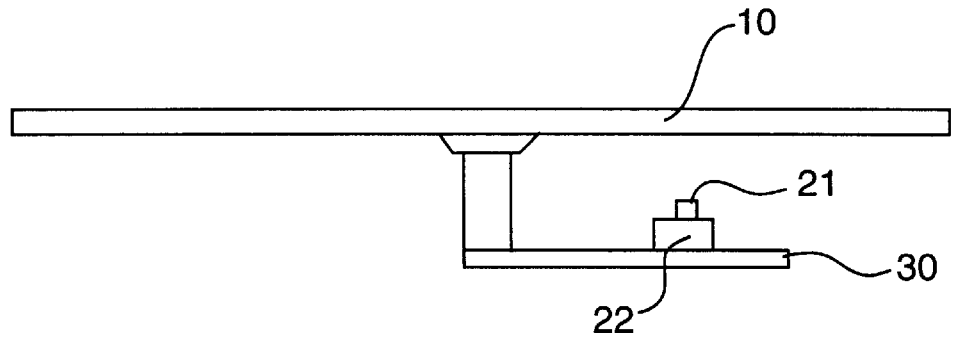
FIG. 1(a) shows a schematic side view of a disk and a pickup lens.
Figure 1B:
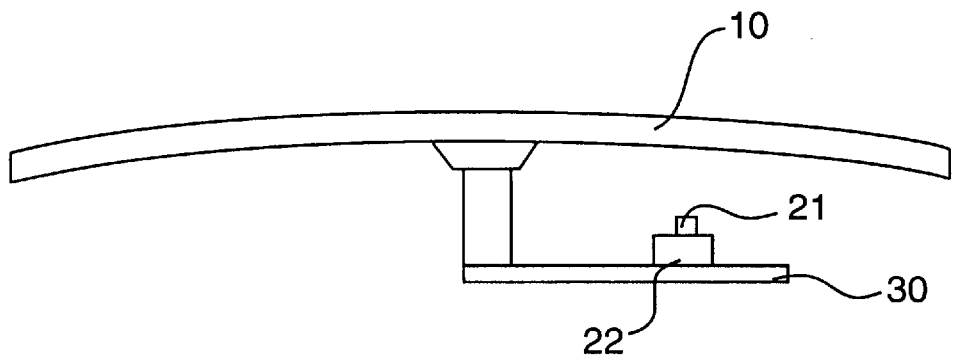
FIG. 1(b) shows a side view of an actual disk and a pickup lens.
Figure 1C:
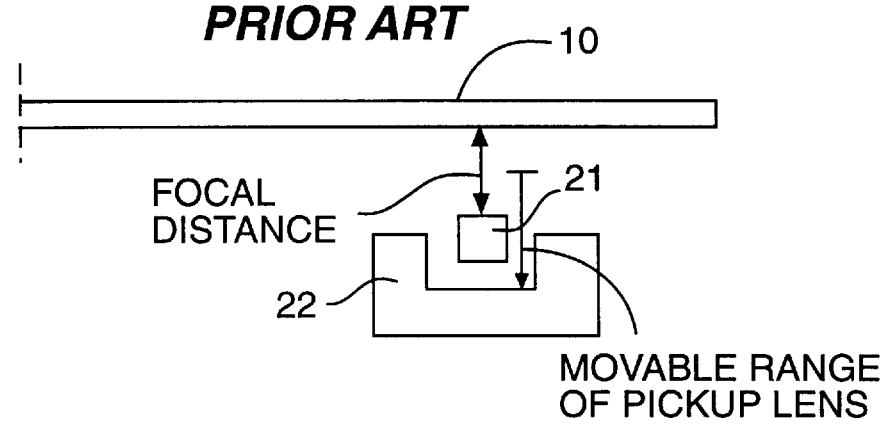
FIGS. 1(c) shows a side view of a focal distance and movable range of a pickup lens.
Figure 2:
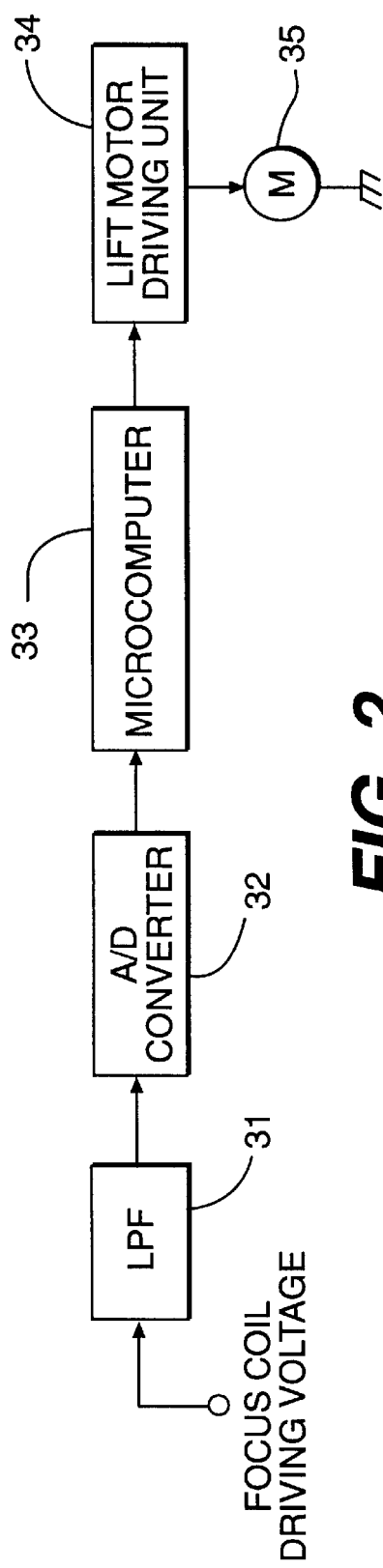
FIG. 2 is a block diagram of a conventional lift servo.
Figure 6:
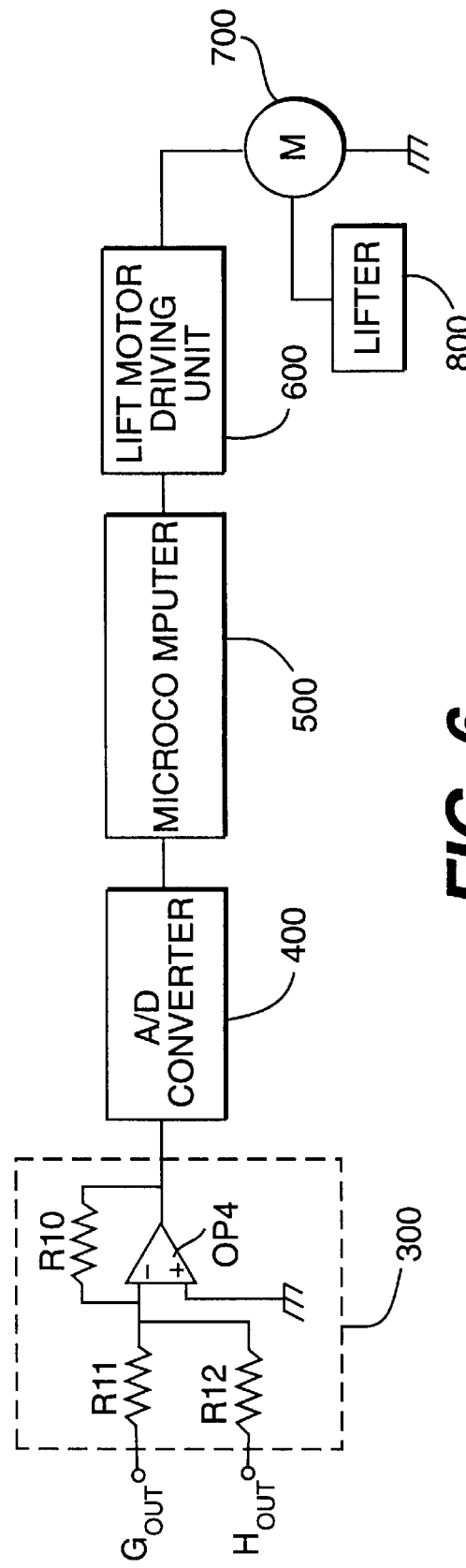
FIG. 6 is a block diagram of a lift control device using a tilt monitor output according to an embodiment of the present invention.
Figure 4:
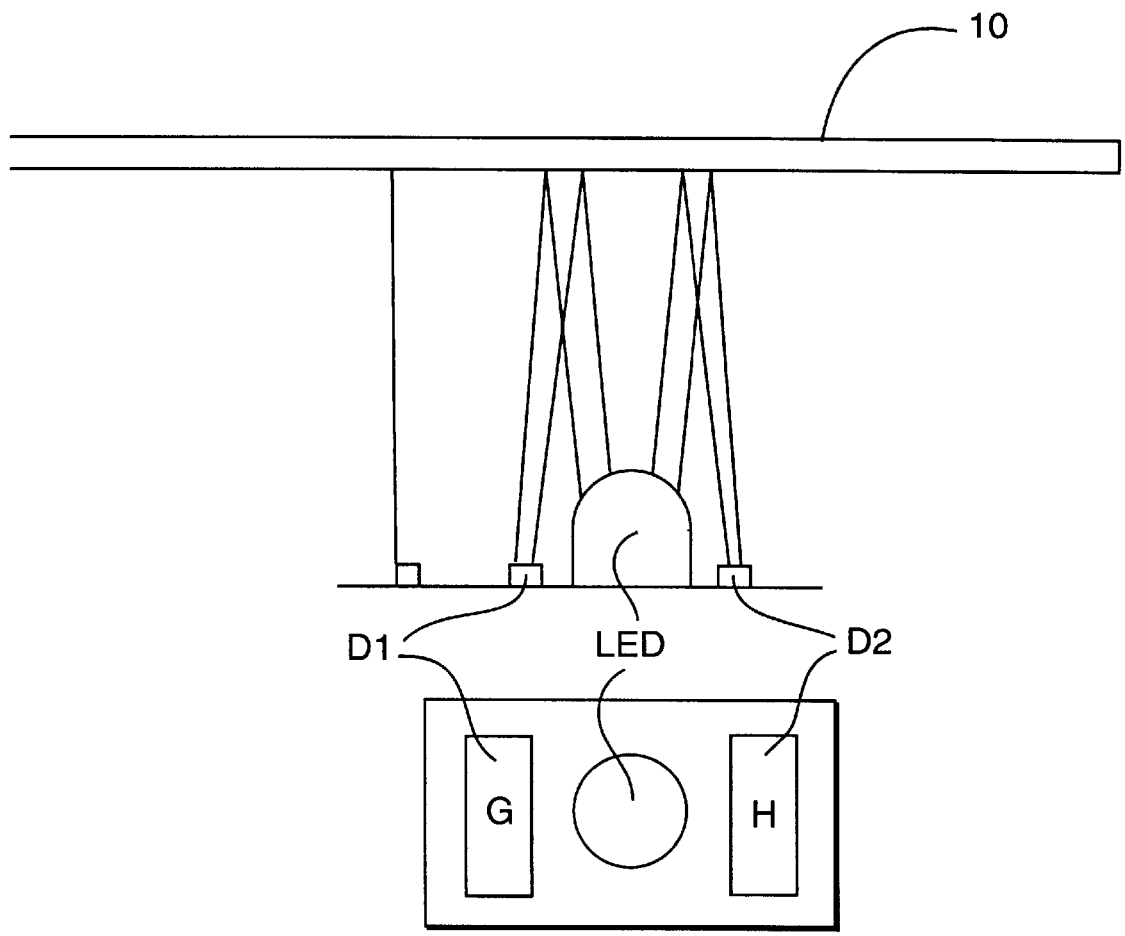
FIG. 4 is a schematic side view of a conventional tilt sensor.
Figure 5:
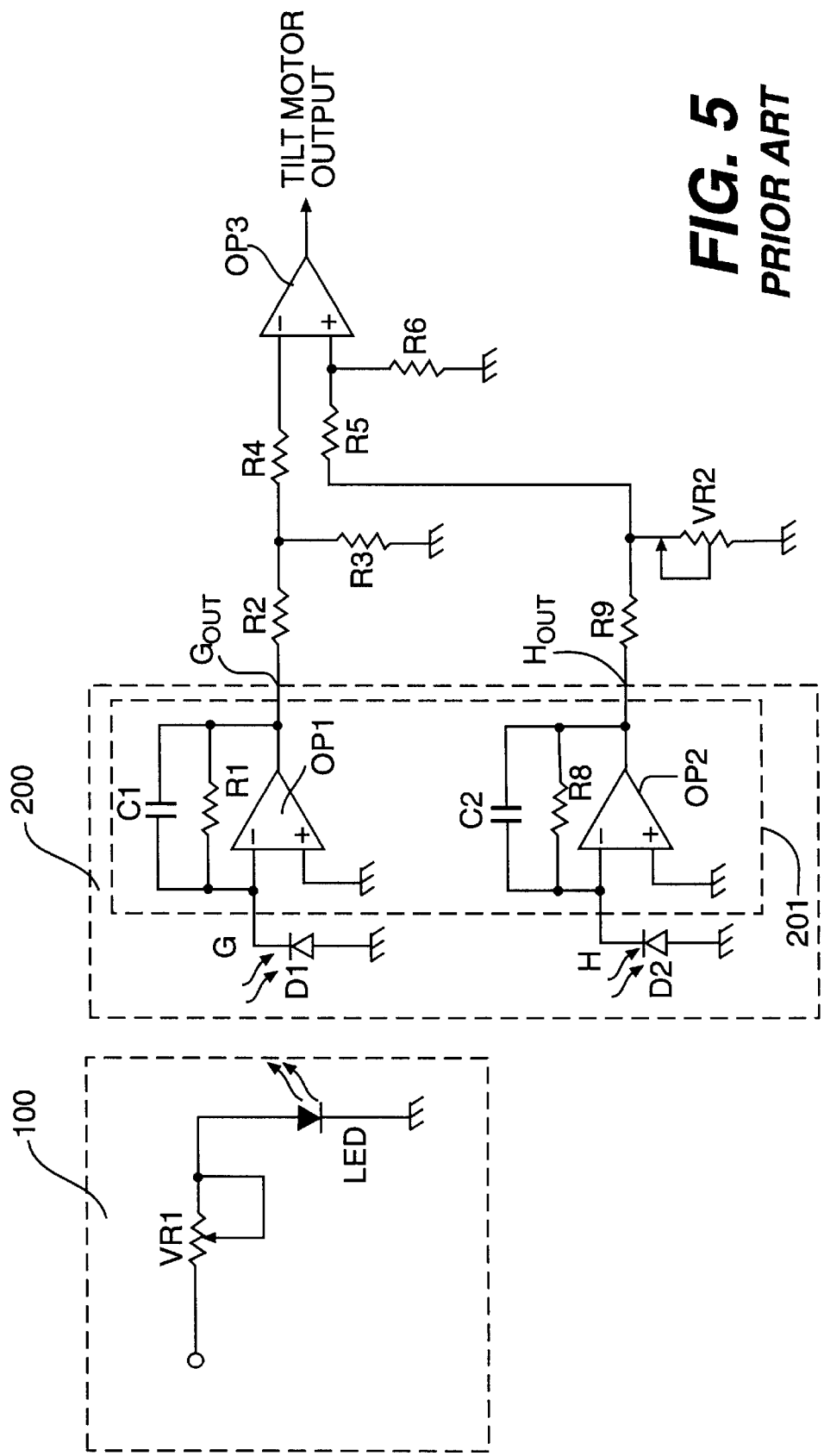
FIG. 5 is a circuit diagram showing a tilt output of a conventional tilt servo.

As shown in FIG. 5 and FIG. 6, the lift control device with a tilt sensor for controlling a lifter according to an embodiment of the present invention comprises a tilt gain control circuit 100 including a variable resistor VR1 and a tilt LED for emitting a light beam to the surface of a disk according to tilt gain control, a current-voltage converting circuit 200 including first and second light receiving elements D1 and D2 for receiving the light beams reflected from the surface of the disk and converting them into currents according to the amount of received light, and a voltage generating circuit 201 including first and second condensers C1 and C2, first and second resistors R1 and R8, and first and second operational amplifiers OP1 and OP2 for converting currents generated by the first and second light receiving elements D1 and D2 into voltages $G_{out}$ and $H_{out}$, respectively, a tilt error detecting circuit 300 including three resistors R10, R11 and R12, and an adder 0P4 for adding the voltages $G_{out}$ and $H_{out}$ from the current-voltage converting circuit 200 to detect a tilt error caused by warping and generate a tilt monitor signal, an analog-to-digital converter 400 for converting the tilt monitor signal generated by the tilt error detecting circuit 300 into a digital signal, a microcomputer 500 for determining the degree of lifting to be performed by a lifter 800 according to the output value of the analog-to-digital converter 400, and a lift motor driving unit 600 for driving a lift motor 700 by the output of the microcomputer 500 to drive the lifter 800.

The amount of light to be output from the tilt LED is determined by the variable resistor VR1 of the tilt gain control circuit 100. The light beams emitted from the tilt LED and reflected from the surface of the disk are converted into currents by the first and second light receiving elements D1 and D2 and then the currents are converted into voltages $G_{out}$ and $H_{out}$ through the current-voltage converting circuit 200.

In the conventional art as shown in FIG. 5, the difference between the two voltages $G_{out}$ and $H_{out}$ are used to generate a tilt motor output which is used only to tilt the pickup lens. However, in FIG. 6 the voltages $G_{out}$ and $H_{out}$ generated by the current-voltage converting circuit 200 are added and converted into the tilt monitor signal and used to move the lifter 800 for vertically moving the pickup assembly according to the warping degree of the disk. With reference to FIGS. 7(a)–7(F), the tilt monitor outputs vary according to the angle between the pickup unit and the disk 10.

Figure 6A:
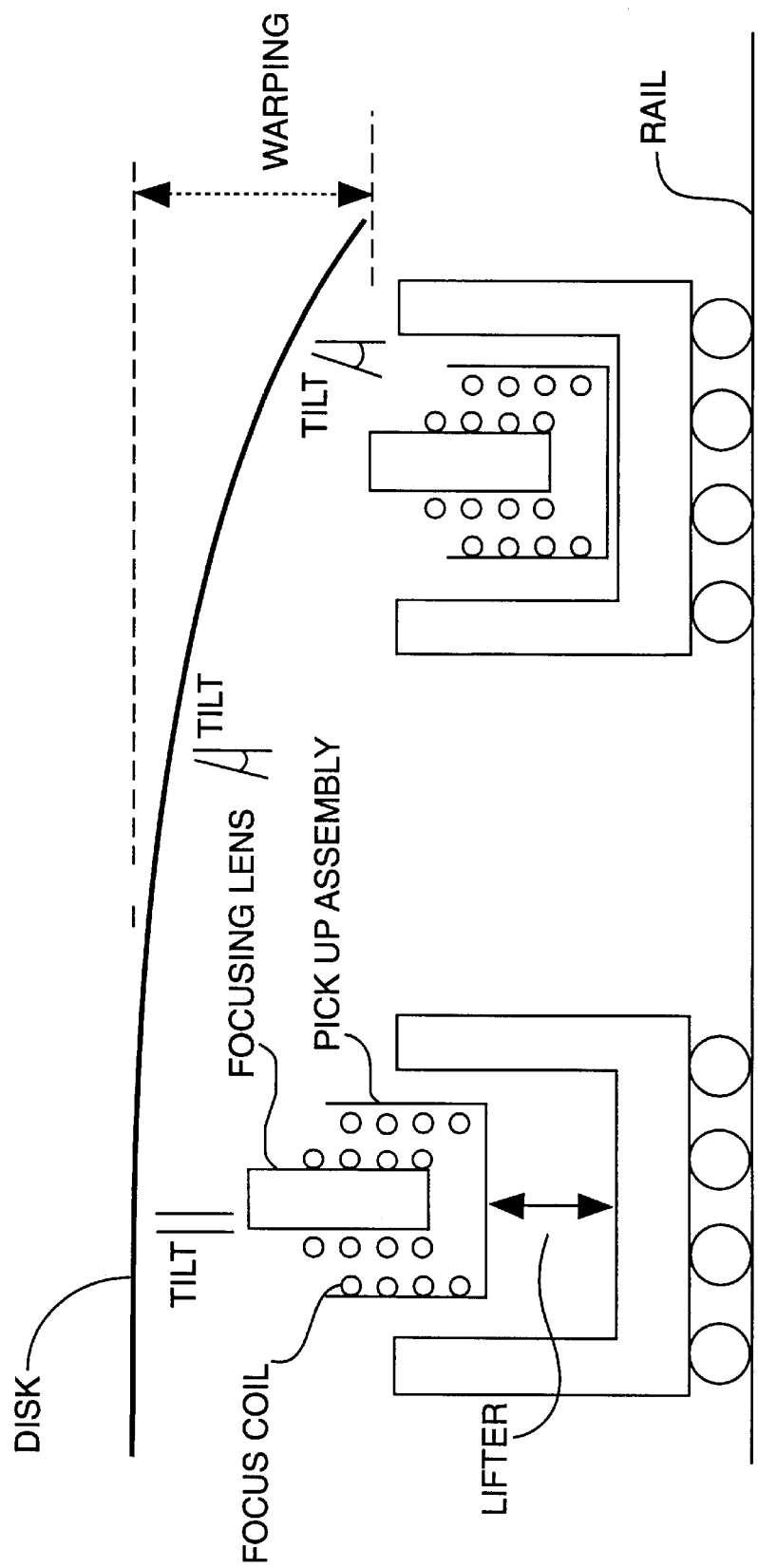
FIG. 6a shows an operation of the lift control device according to the embodiments of the present invention.
Figure 7A:
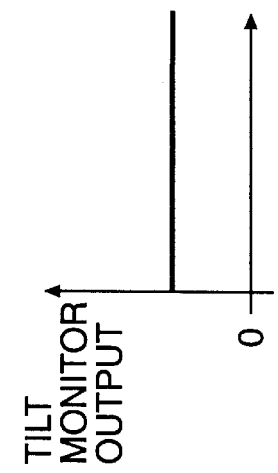
FIGS. 7(a)–7(c) show tilt monitor output signals when the distance between the tilt sensor and the disk is normal, close, and distant as shown in FIGS. 7(d)–7(f).
Figure 7B:
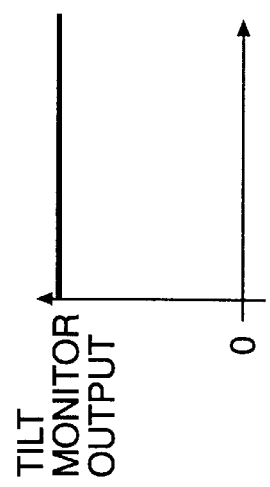
Figure 7C:
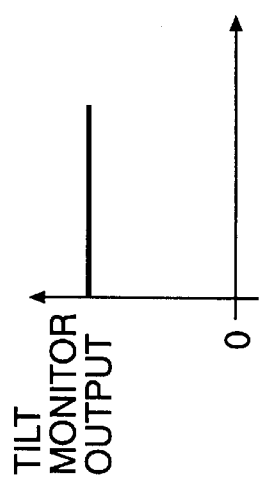
Figure 7D:
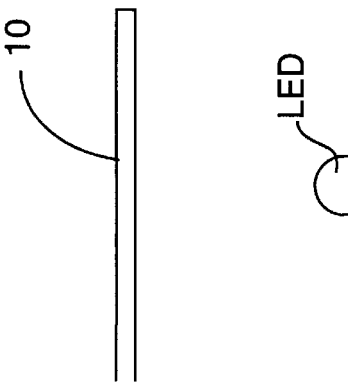
Figure 7E:
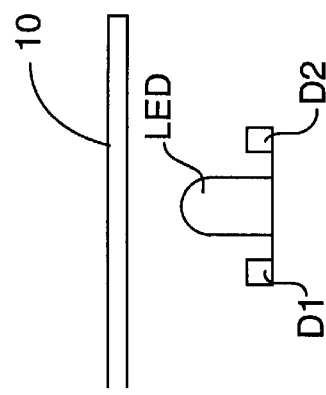
Figure 7F:
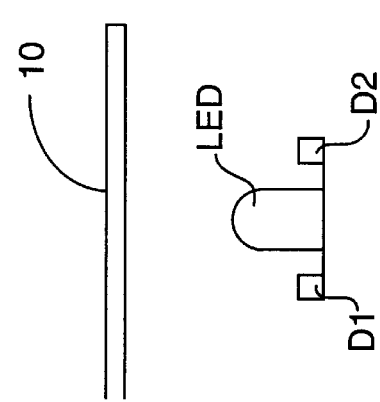

The tilt monitor output is converted into a digital signal and then supplied to a microcomputer 500 for determining an amount of lifting needed, by analyzing the tilt monitor output. The lift motor 700 for driving the lifter 800 for moving the pickup assembly, is driven by the lift motor driving unit 600 and, consequently, the distance between the pickup unit and the disk 10 is maintained at a prescribed value. That is, the tilt error caused by the droop of a disk can be used selectively to control the lifter, and the lifter is controlled so that the focus lens mounted on the pickup unit can be located at the center of its movable range. As shown in FIG. 6a, the lift control device of the present invention allows the lifter 800 to selectively move the pickup assembly vertically according to the warping amount of the disk using a tilt sensor. The selective movement of the pickup assembly positions the pickup assembly such that when the focus coil is driven to move the focusing lens within its movable range; the focusing lens will always be focused with respect to the disk for reading data therefrom. In constrast, the conventional lift servo merely moves the pickup assembly into one fixed position prior to a reading operation, and is not able to selectively move the pickup assembly according to the tilt amount.

Further, the tilt errors caused by swerved tilt bias point can be prevented by equalizing tilt gain and tilt balance state which are set to remove crosstalk. For example, the tilt gain and the resultant tilt balance are controlled in order that the tilt monitor output may be 3 volts, and if the tilt monitor output becomes 3.5 volts according to the difference in the light reflected from the surface of the disk and received by each sensor, then the tilt error caused by the long term swerved tilt balance can be corrected by controlling the tilt monitor output at a prescribed value at all times through moving the lift motor 700.

That is, the long term tilt error can be used to correct the vertical position of the pickup assembly irrespective of the disk and the inner or outer circumference of the disk, according to the reflection factor of the disk.

While specific embodiments of the invention have been illustrated and described wherein, it is to realize that modifications and changes will occur to those skilled in the art. It is therefore to be understood that the appended claims are intended to cover all modifications and changes as fall within the true spirit and scope of the invention.

What is claimed is:

1. A lift control device with a tilt sensor for controlling a lifter which moves a pickup assembly vertically, the device comprising:

light means for emitting a light beam to the surface of a disk;

converting means for converting a light beam reflected from the surface of the disk into voltage signals;

tilt detecting means for detecting a tilt between an axis of the light beam and an axis perpendicular to the surface of the disk according to the voltage signals from said converting means and generating a tilt monitor signal based on the detection; and driving means for controlling the lifter and thereby vertically moving the pickup assembly according to the tilt monitor signal, and maintaining the tilt monitor signal at a fixed level, wherein the driving means drives a lift motor for controlling the lifter according to the tilt monitor signal.

2. A lift control device according to claim 1, wherein said light means includes a variable resistor and light emitting diodies (LEDs) controlled by said variable resistor for emitting the light beam to the surface of said disk.

3. A lift control device according to claim 2, wherein said converting means includes light receiving elements for receiving the light beam reflected from the surface of said disk and converting the received light beam into currents, and voltage generating means including condensers, resistors, and differential amplifiers, for converting the currents into the voltage signals.

4. A lift control device according to claim 3, wherein said tilt detecting means includes resistors and an adder for adding the voltage signals generated by said converting means.

5. A lift control device according to claim 1, wherein said converting means includes light receiving elements for receiving the light beam reflected from the surface of said disk and converting the received light beam into currents, and voltage generating means including condensers, resistors, and differential amplifiers, for converting the currents converted by said light receiving elements into the voltage signals.

6. A lift control device according to claim 1, wherein said tilt detecting means includes resistors and an adder for adding the voltage signals generated by said converting means.

7. A lift control device according to claim 6, wherein said driving means includes an analog-to-digital converter and a microcomputer for determining a degree of lifting to be performed by the lifter.

8. A lift control device according to claim 1, wherein the pickup assembly includes a focusing lens, and a focusing coil for vertically moving the focusing lens within a predetermined range.

9. A method of controlling lifting to be performed by a lifter in a laser disk player wherein the lifter vertically moves a pickup assembly, the method comprising the steps of:

detecting by a tilt sensor a tilt between an axis of a light beam emitted to a surface of a disk and an axis perpendicular to the surface of the disk;

outputting a tilt monitor signal based on the detected tilt;

controlling the lifter and thereby vertically moving the pickup assembly according to the tilt monitor signal; and maintaining the monitor signal at a fixed level, wherein the controlling step includes the step of driving a lift motor according to the tilt monitor signal to control the lifter.

10. A method according to claim 9, wherein said detecting step includes the steps of emitting the light beam to the surface of the disk according to tilt gain and receiving a light beam reflected from the disk.

11. A method according to claim 10, wherein said detecting step includes the steps of converting the received light into voltage signals and adding the voltage signals to output the tilt monitor signal.

12. A method according to claim 9, wherein said controlling step includes the step of determining using a microprocessor a degree of lifting of the pickup assembly to be performed by the lifter according to the tilt monitor signal.

13. A method according to claim 9, wherein said controlling step includes the step of maintaining a predetermined distance between the pickup assembly of the laser disk player and the disk.

14. A method according to claim 9, further including the step of:

vertically moving a focusing lens of the pickup assembly by controlling a focus coil of the pickup assembly.

* * * * *